Oct. 18, 1955  J. M. UNK  2,721,301
OVERLOAD CONTROL FOR ELECTRIC MOTOR
Original Filed Sept. 28, 1948  2 Sheets-Sheet 1

INVENTOR.
JACOB MARINUS UNK
BY Fred M. Vogel
AGENT

Oct. 18, 1955
J. M. UNK
2,721,301
OVERLOAD CONTROL FOR ELECTRIC MOTOR
Original Filed Sept. 28, 1948
2 Sheets-Sheet 2
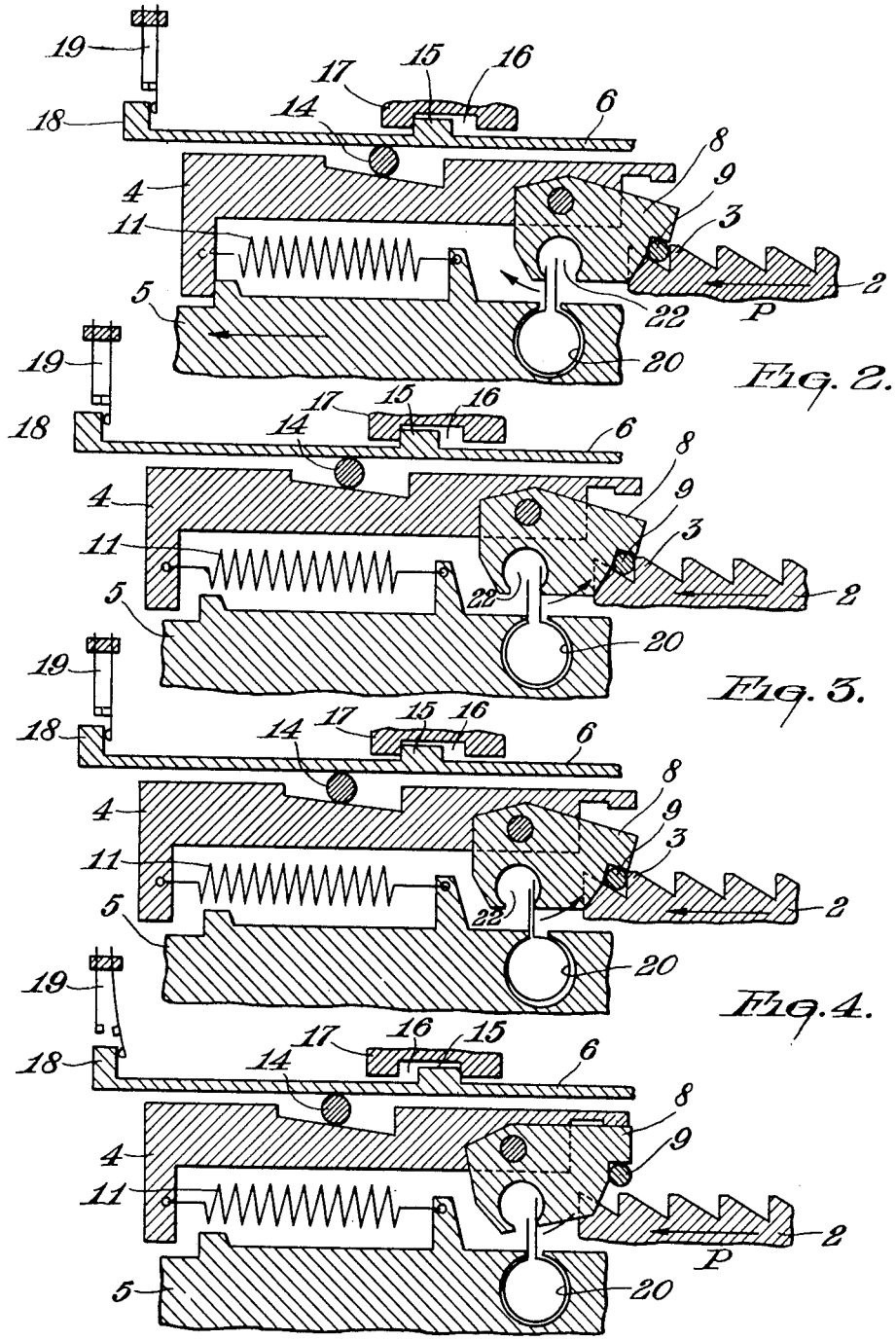
INVENTOR.
JACOB MARINUS UNK
BY Fred M. Vogel
AGENT

United States Patent Office 2,721,301
Patented Oct. 18, 1955

2,721,301

OVERLOAD CONTROL FOR ELECTRIC MOTOR

Jacob Marinus Unk, Hilversum, Netherlands, assignor to Hartford National Bank and Trust Company, Hartford, Conn., as trustee Original application September 28, 1948, Serial No. 51,604, now Patent No. 2,659,469, dated November 17, 1953. Divided and this application October 11, 1952, Serial No. 314,253

Claims priority, application Netherlands October 4, 1947

3 Claims. (Cl. 318—475)

This application is a division of my co-pending U. S. application Ser. No. 51,604, filed September 28, 1948, now Patent No. 2,659,469 relating to automatically operating overload release clutches.

This invention relates to an electrically driven apparatus comprising a plurality of overload release clutches.

One object of the invention is to provide an apparatus of the said kind in which the common driving means for the clutches is controlled in dependency of the state of operation of the clutches.

A further object of the invention is to provide an apparatus for driving a plurality of shaft positioning mechanisms by means of a single electro-motor, said motor being automatically switched off when the shafts of all shaft positioning mechanisms are locked in the desired predetermined angular position.

In accordance with this invention in an electrically driven apparatus comprising a plurality of automatically operating overload release clutches, each clutch is provided with an actuating member adapted to perform a limited stroke upon disengagement of the clutch thereby to operate an electrical contact device associated with the clutch so as to open a contact set in said contact device upon overloading of the driven part of the clutch, said clutches being driven by a common electrically driven driving means and said contact sets of the said clutches being all electrically connected in parallel and as such interposed in the electrical circuit of the energy supply to the common driving means.

Figure 1:
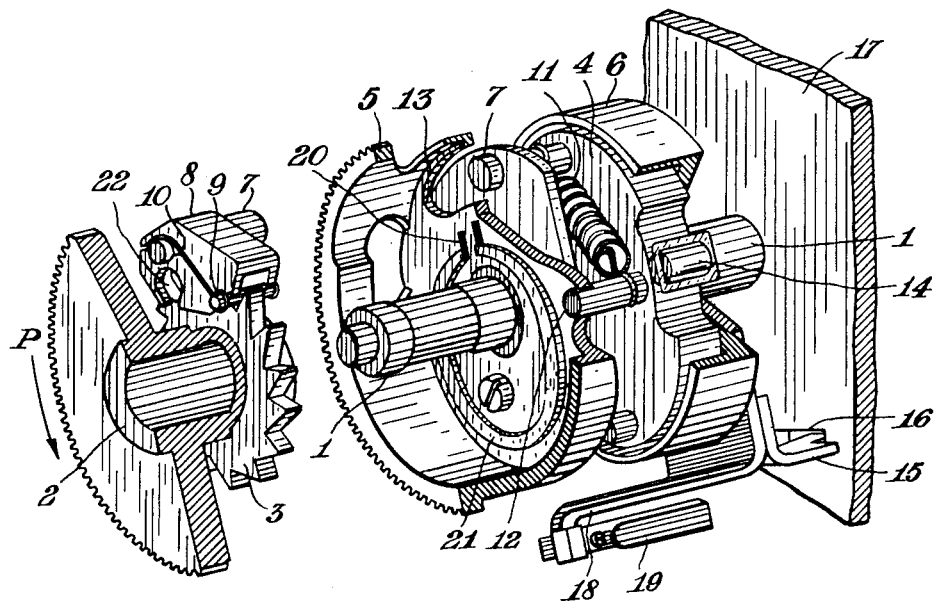

In order that the invention will be clearly understood and readily carried into effect it will now be described more fully by reference to the accompanying drawing, given by way of example, in which Fig. 1 is a perspective view of an overload release clutch suitable for use in the apparatus according to the invention, the clutch being shown with some parts removed and others in partially exploded relationship.

Figure 6:
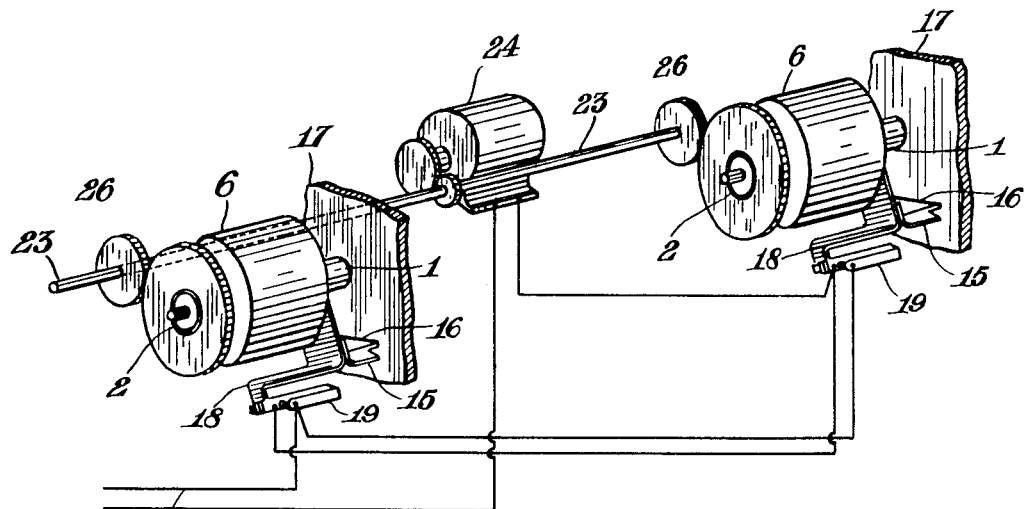

Figures 2 to 5 inclusive illustrate diagrammatically the various relationships of parts during a complete operation of the device shown in Fig. 1 and Fig. 6 is a perspective view of an embodiment of the apparatus according to the invention, wherein a plurality of the clutches shown in Fig. 1 are driven by means of a common driving means.

In Fig. 1 the reference numeral 1 denotes the control shaft of the clutch around which a driving gear wheel 2, with a toothed wheel 3 rigidly connected thereto, an auxiliary member 4, a cupshaped wheel 5 constituting the driven part of the clutch and the housing 6 are freely rotatable. For the sake of clarity the driving gear wheel 2 is represented separately. The auxiliary member 4 is coupled with the toothed wheel 3 by means of a pawl which is pivoted on a pin 7 carried by the auxiliary member. The pawl consists of a gutter-shaped ratchet lever 8 carrying a roller 9. The roller 9 is pressed on the edges of the sides of the ratchet lever and the central part of the roller 9 cooperates with the toothed wheel 3. The ends of the roller 9 are caught by a spring 10 secured to the ratchet lever. The auxiliary member 4 is coupled with the wheel 5 through the intermediary of a pre-tensioned spring 11, one end of which embraces the pin 7, whereas the other end is held by the pin 12 which is secured in the bottom of the wheel 5. The latter exhibits an aperture 13 through which extends the pin 7 and which permits a relative rotation between the auxiliary member 4 and the outgoing wheel 5 whereby the spring 11 is further stretched. Complete relaxation of spring 11 is prevented, since the pin 7 is arrested by a not represented part of the edge of the aperture 13.

The auxiliary member 4 is provided at its periphery with a number of recesses each of which contains a grip roller 14. These grip rollers function as a ratchet coupling acting only in one direction of rotation between the auxiliary member 4 and the edge of the housing 6 embracing this auxiliary member. The housing 6 has rigidly secured to it a lug 15 which extends in a recess 16 of a stationary plate 17 in which the shaft 1 is supported. Owing to this the housing 6 is adapted to rotate around the shaft 1 only through a stroke determined by the co-operation between the lug 15 and the edges of the recess 16. To the housing 6 is also secured an arm 18, the end of which cooperates with one of the contact springs of an electrical contact device 19.

The driven gear wheel 5 comprises a spring 20 in the shape of a wire or band which surrounds the shaft 1 and of which the ends extend in a radial direction, whereas the remaining part is stored in a hollow edge 21 provided on the gear wheel 5. The free ends of the spring 20 cooperate with the edges of an aperture 22 provided in one of the side walls of the ratchet lever 8 as will be set out in the following.

For explaining the operation of the clutch the latter is represented diagrammatically in Figs. 2 to 5, it being supposed, for convenience, that the separate members of the clutch perform a longitudinal movement instead of a rotating movement. In the following the expression "moments" will be used to bring out the applicability to the rotating movement though in conjunction with the imagined longitudinal movement the expression "forces" would be better. Any parts corresponding to these shown in Fig. 1 bear the same reference numerals.

In the position shown in Fig. 2, which corresponds to that shown in Fig. 1, the pawl 8 meshes with the toothed wheel 3. On the driving part 2 being moved in the direction indicated by the arrow $P_1$ the auxiliary member 4 is carried with and its movement is transmitted to the driven part 5 through the spring 11. The ratchet lever 8 and the roller 9 being compelled to cooperate with the toothed wheel 3 due to pressure exerted by the lefthand free end of the spring 20 on the edge of the aperture 22. The bottom of the recesses in the edge of the auxiliary member 4 containing the grip roller 14 extends in a manner such that in the direction of movement in question the auxiliary member is free to move with respect to the housing 6. The remaining slight friction provides that the housing occupies the extreme lefthand position which it is adapted to occupy in connection with the abutment of the lug 15 against the edge of the recess 16. In this position of the housing 6 the contact device 19 is closed. The spring 11 is pre-tensioned, which pretension is maintained by means of a stop (shown in Fig. 2 at the left) between the auxiliary member and the driven part 5, the operation of which stop corresponds with abutment of the pin 7 against the edge of the aperture 13 (Fig. 1). As long as the driving moment remains smaller than the moment exerted by the preliminary tension of the spring 11, the relative positions of the auxiliary member 4 and the driven part 5 are maintained. If, however, the latter is overloaded or arrested, the auxiliary member 4 will leave the stop on the driven part and the spring 11 will be further stretched. The driven part 5 comes to a standstill, whereas the auxiliary member is further moved by the part 2. The point of application of the force exerted by spring 20 on the pawl 8 is shifted and at the same time this force reverses its direction, since, as shown in Fig. 3, the righthand free end of spring 20 engages the ratchet lever due to the relative movement of the auxiliary member and the driven part 5. The spring 20 tends to lift the pawl but does not succeed therein owing to the pressure exerted by the gear wheel 3 on the roller 9. The movement of the auxiliary member is as yet maintained, with the result that the relative displacement of the auxiliary member and the part 5 is still further increased until the other end of spring 20 also exerts pressure on the ratchet lever (Fig. 4). This results in that upon the auxiliary member 4 being further driven, the pressure exerted on the ratchet lever is sufficient for lifting the pawl 8, the roller 9 thereby rolling both over the flank of the engaging tooth of the gear wheel 3 and over the sides of the ratchet lever 8 until roller is free from the said tooth and the connection between the auxiliary member of the driving part 2 is completely broken. The roller 9 is caused to resume its initial position with respect to the ratchet lever 8 by the spring 10 shown in Fig. 1. After that the auxiliary member only experiences a moment from the stretched spring 11 which tends to move the said member in reverse direction. For such a movement, however, the grip roller 14 immediately becomes active and locks the auxiliary member with the housing 6 due to which the housing is compelled to follow the returning auxiliary member, thereby moving the lug 15 in the recess 16 until it is arrested by the righthand wall of the recess. At this moment the return of the housing 6 and consequently also of the auxiliary member 4 coupled therewith by the grip roller 14 is terminated. The position then occupied is shown in Fig. 5. The reverse movement of the auxiliary member is terminated before the stretched spring 11 relaxes to its initial length so that a driving movement remains exerted on the driven part 5. The pawl 8 remains lifted, since although upon reversal of the movement of the auxiliary member the pressure exerted by the left end of spring 20 on the edge of the ratchet lever 8 has ceased, the right end of this spring exerts sufficient force to keep the ratchet lever lifted.

The housing 6 on being moved to the right breaks the contact between the contact springs of the electrical contact device 19, by means of the arm 18 cooperating with one of these springs. As the auxiliary member and the driving part 2 are no longer coupled the latter is adapted to move freely. This state is maintained as long as the driven part 5 is arrested or overloaded.

When the loading moment of this part decreases, so that it becomes smaller than the moment exerted by spring 11, relative displacement of the auxiliary member 4 and the driven part 5 takes place again but now becomes the part 5 is moved in the original direction of movement by spring 11. Upon this movement of the part 5 the force exerted by spring 20 on the ratchet lever 8 changes its location and also its sign, so that the pawl 8 with the roller 9 is urged to engage the gear wheel 3 and consequently the driving connection between the driving part 2 and the auxiliary member 4 is re-established. The spring 11 has relaxed until the auxiliary member 4 and the driven part 5 directly engage one another by means of the stop referred to, as a result of which the parts reassume the relative positions shown in Fig. 2. The tension of spring 11 no longer affects the grip-roller coupling between the auxiliary member 4 and the housing 6, so that even a slight force is sufficient for urging the latter to its initial position, in which the cam 15 engaged the left side of the recess 16.

In the majority of cases the contact spring of the contact device 19 cooperating with the arm 18 is capable of performing this, if not an additional spring may be provided. The movement to the left of the housing 6 results in that the contact device 19 is closed and the clutch is completely in the state existing prior to overloading.

Fig. 6 shows an electrically driven apparatus, comprising a number of clutches of the aforesaid type deriving their movement by means of gear wheels 26 from a common driving shaft 23, which is driven by an electromotor 24. The motor is controlled by the clutches, to which end the contacting devices 19 of the clutches are electrically connected in parallel and interposed as such in the motor feeding circuit 25. On overloading or arresting the outgoing part of a clutch, which may, for instance, be used for driving a shaft positioning mechanism (not shown) for accurately positioning a tuning member of a radio transmitter or radio receiving apparatus in a predetermined position, the contact between the springs 19 associated with the clutch and controlled by the arm 18 thereof is interrupted. Due to the parallel connection of the contacts 19 of the clutches, the opening of the contact 19 associated with the clutch, which is disengaged last of all, completely interrupts the motor feeding circuit, so that the motor is stopped. The motor 24 is restarted, when, by removing the overload of the driven part of any of the clutches the contact associated with this clutch is reclosed.

What I claim is:

1. An electrically driven apparatus comprising a plurality of automatically operating overload release clutches, each clutch having a driving part and a driven part connected to said driving part whereby upon overload of said apparatus said connection is completely severed and upon removal of said overload said connection is automatically re-established, each clutch being provided with an actuating member adapted to perform a limited stroke upon disengagement of the clutch and cooperating with an electrical contact device to open a contact set in said contact device upon overloading of the driven part of said clutch, said clutches being driven by a common, electrically driven driving means, said contact sets being all electrically connected in parallel in an electrical circuit connecting said electrically driven driving means to a source of electric energy.

2. An electrically driven apparatus comprising a plurality of automatically operating overload release clutches, each of which comprises, in combination a driving gear wheel, a driven gear wheel, a torque transmitting auxiliary member, spring means connecting said auxiliary member to said driven gear wheel, said spring means permitting relative rotative displacement between said auxiliary member and said driven gear wheel upon overloading of said driven gear wheel, first coupling means for coupling and uncoupling said auxiliary member to said driving gear wheel, means for governing said first coupling means, said last-named means being responsive to said relative rotative displacement, an actuating member, second coupling means for coupling and uncoupling said auxiliary member to said actuating member, said second coupling means being operative for checking said auxiliary member against movement thereof in the direction in which said relative rotative displacement between said auxiliary member and said driven gear wheel is diminished after said first coupling means have initially become disengaged upon overloading of said driven gear wheel, said second coupling means being disengaged whenever said first coupling means is engaged, and vice versa, said actuating member being movably mounted with respect to a stationary member, means on said stationary member operatively associated with said actuating member for limiting the movement of said actuating member in either direction to a stroke of predetermined length, said stroke length being insufficient to permit, upon the second coupling means becoming operative, a retrograde movement of said auxiliary member coupled to said actuating member, and an electrical contact device operatively associated with said actuating member to be operable thereby by movement thereof, said contact device comprising a contact set adapted to be opened by the movement of the actuating member upon overloading of the driven gear wheel, said clutches being driven by a common electrically driven, driving means, said contact sets of said contact devices associated with said clutches being all electrically connected in parallel and as such interposed in the electrical circuit of the electrical energy supply to the common driving means.

3. An electrically driven apparatus comprising a plurality of automatically operating overload release clutches, each clutch having a driving part and a driven part connected to said driving part whereby upon overload of said apparatus said connection is completely severed and upon removal of said overload said connection is automatically re-established, each for driving a shaft positioning mechanism for accurately locking a shaft in any one of a series of predetermined positions, each of said clutches being provided with an actuating member adapted to perform a limited stroke upon disengagement of the clutch and cooperating with an electrical contact device to open a contact set in said contact device upon locking of the shaft of the shaft positioning mechanism driven by way of said clutch, said clutches being driven by a common electrically driven, driving means, said contact sets being all electrically connected in parallel and an electrical circuit connecting said electrically driven driving means to a source of electric energy.

References Cited in the file of this patent

UNITED STATES PATENTS

| | | |
|---|---|---|
| 2,452,178 | Brownlee | Oct. 26, 1948 |
| 2,536,319 | Slack | Jan. 2, 1951 |
| 2,580,298 | Hopkins et al. | Dec. 25, 1951 |